United States Patent Office 3,009,829
Patented Nov. 21, 1961

---

3,009,829
IMPREGNATING COMPOSITION, METHOD OF APPLYING SAME TO ASBESTOS, AND ARTICLE PRODUCED THEREBY
A. Peter Gouveia, Somerville, N.J., assignor to Johns-Manville Corporation, New York, N.Y., a corporation of New York
No Drawing. Filed Mar. 25, 1957, Ser. No. 647,983
21 Claims. (Cl. 117—126)

The present invention relates to an impregnating composition for asbestos materials such as woven and nonwoven cloth, yarn, braid, tape, felt, paper, etc., a method of applying the same, and is particularly applicable to the treatment of woven and braided asbestos fabrics. This application is a continuation-in-part of my copending application Serial No. 535,285, filed September 19, 1955, and now abandoned.

Previous impregnating compositions fail to impart the characteristics and/or properties considered desirable or necessary to substantially improve upon the physical characteristics of asbestos cloth, paper, etc. For example, the sodium silicate and bentonite clay coating composition for cloth and paper taught by United States Letters Patent No. 1,577,450 to Crowell when employed in the treatment of asbestos materials, such as cloth, etc., fails to impart water resistance, as well as certain of the other advantages of the present invention, to the extent necessary for satisfactory use of asbestos materials in many applications. Moreover, previous impregnants or treatments have failed to significantly increase the resistance of asbestos cloth, paper, or related products to numerous deleterious elements such as water, oil, grease, etc. or wear, abrasion, unravelling, etc.

The instant invention has as its principal object the provision of an impregnating or treating composition for asbestos products such as cloth, paper, etc., and a method of applying the same, which in addition to substantially retaining the advantageous properties of the original material, imparts greatly increased resistance or repellency to penetration by fluids such as water, grease, oil and other substances, and also provides high resistance to leaching, ravel, curl, wear, abrasion, etc.

A further object of the invention is to provide an impregnating or treating composition and method of applying the same, which substantially improves the physical characteristics of asbestos products by increasing the strength of asbestos cloth, yarns, etc., both before and after burnout of the organic carrying fibers which are generally present in such products.

A still further object of the invention is to provide an impregnating or treating composition which will increase the durability of seams in an article fabricated from asbestos cloth and the dimensional stability of cloth and especially braid.

These and other desirable advantages and objects are provided by an impregnating or treating composition which does not deleteriously affect the flexibility or appreciably increase the stiffness of an asbestos product, nor does it impair the ease of turning an article after fabrication.

The present invention consists of an impregnating composition for the treatment of asbestos materials or products such as yarn, woven and non-woven cloth, tape, braid, felt, etc., and paper, and method of applying the same. The composition or material comprises a mixture or combination of ingredients consisting of bentonite clay, an alkali metal silicate, zinc oxide, and a compatible silicone water repellent. The impregnating or treating composition may be formed by combining these components within the following approximate percentages by weight:

| | Percentages |
|---|---|
| Bentonite clay | 0.01–30.0 |
| Alkali metal silicate (solids) | 0.04–50.0 |
| Zinc oxide | 0.01–26.0 |
| Silicone water repellent | 0.03–10.0 |

The composition may be prepared simply by mixing the ingredients in the proportions specified, and, while it is generally preferred that the ingredients be mixed with or dispersed in approximately 60–95% by weight of water to form a slurry or suspension, it has been found that an alkali metal silicate solution containing up to about 42% solids provides sufficient water to form a workable or spreadable slurry of the treating composition. Moreover, a dispersion or slurry of the impregnating composition may continue up to approximately 99.6% by weight of water.

The following analysis is typical of a type of bentonite clay, Black Hills grade of Eastern Clay Products Co., which performs satisfactorily in the asbestos impregnating composition:

| | Percentages |
|---|---|
| $SiO_2$ | 65.79 |
| FeO | 0.42 |
| $Fe_2O_3$ | 3.15 |
| $Al_2O_3$ | 19.40 |
| CaO | 0.94 |
| MgO | 2.40 |
| $Na_2O$ and $K_2O$ | 2.72 |
| $SO_3$ | 0.30 |
| $TiO_2$ | 0.16 |

The percentages given throughout the specification and claims for the alkali metal silicate component are based upon alkali metal silicate solids unless otherwise specified. However, since commercial alkali metal silicates are normally sold as aqueous solutions and used as such if appropriate, the examples, as a matter of convenience, illustrate the use of typical commercial silicate solutions of common concentrations. It is to be understood that since one skilled in the art may readily determine appropriate amounts of silicates regardless of their concentration or solids content, the recitation of the solids content in this specification and/or the appended claims is to be considered as illustrative rather than limiting. The solids content of alkali metal silicate solution depends primarily, of course, upon the source or supplier and upon the particular kind of silicate, such as sodium or potassium.

The silicone water repellent component may comprise substantially any of the now numerous water repellent silicones available. Of course the silicone must be water soluble or water dispersible to be prepared and applied in accordance with this invention, and it must be compatible with the components, such as, for example, the alkali ingredients, of the impregnating or treating composition. Typical of the suitable compatible silicones are Dow Corning's XS-1 (25% silicone) and General Electric's SC-50 (20% silicone), both sodium methyl siliconate solutions; General Electric's 81268, a water dispersion of a silicone fluid consisting primarily of a stable polymer of methyl hydrogen siloxane; General Electric's 81432A, a mixture of methyl hydrogen polysiloxane and dimethyl siloxane; and Dow Corning's silicone emulsions DeCetex 104 and DeCetex 105 which consist essentially of dimethyl polysiloxane containing hydrogen. The DeCetex 104 and 105 silicones, for example, require a catalyst; however the manufacturer or supplier of the silicone provides curing aids such as catalysts and information as to their use if the particular silicone requires the same. These silicones are normally supplied in the form of solutions or emulsions (ranging from approximately 10 to 75 percent concentration) or as fluids which can be emulsified by the purchaser. In either case the percentages given above or throughout the specification and claims are based upon the silicone content, unless qualified. The silicone water repellent component may be included in the composition in amounts substantially greater than the 10 percent by weight, the maximum proportion indicated above. However, since the benefits, such as increased water repellency, derived from increasing the relative proportion of silicone above approximately 10 percent by weight are insignificant, such an increase, though not necessarily detrimental, is expensive and unnecessary. Thus compositions containing a silicone water repellent in amounts in excess of approximately 10 percent by weight are therefore considered to be within the scope of this invention.

While this invention is not to be limited by any theory or explanation it is believed that complexes are formed by certain of the ingredients. Also, the silicone water repellent is considered to be necessary to impart to the asbestos a high degree of resistance or repellency to water and other fluids. It should be understood, however, that the many advantages and improvements provided by this invention are the result of a combination of all the component ingredients in the above approximate specified percentages.

Obviously, it may be desirable to include or add additional materials to facilitate the preparation or application of the impregnating or treating composition, or to impart collateral benefits or properties to asbestos products. In certain applications it may be advantageous to include a small amount of a compatible surface active agent, such as, for example, approximately 0.01% by weight of the impregnating slurry, to reduce the surface tension of the slurry. Also, the inclusion of an antifoam agent, such as Dow Corning's "Antifoam A" silicone emulsion, a synthetic silicone foam inhibitor, may be appropriate or desirable. Additionally, if a colored product is desired, for example, a compatible dye or pigment may be included in the slurry in amount depending upon the shade or color desired, the weight of the cloth or other asbestos material, the amount of pickup or the period of impregnating or treating. It is to be understood however that the foregoing is not to be considered part of the present invention but merely exemplary of some of the well-known and conventional practices employed in similar arts which may or may not be applicable or desirable in the practice of this invention.

It has been found that compositions applicable for the treatment of products and articles adaptable for substantially any use such as safety gloves, and cloths, braided tubing, gasketing, etc., may be formulated in accordance with the following approximate percentages by weight:

| | Percentages |
|---|---|
| Bentonite clay | 0.5–5.0 |
| Sodium silicate (approximately 42% solids) | 2.0–25.0 |
| Zinc oxide | 0.3–5.0 |
| Compatible silicone water repellent (approximately 25% silicone) | 0.2–5.0 |
| Water | 70.0–90.0 |

Since a dispersion or slurry of an impregnating or treating composition formulated within these approximate percentages will impart all of the important requisites or desirable characteristics set forth above as well as advantageously improving asbestos products or articles for substantially any use or application calling for these properties, the above approximate ranges of components or ingredients may be considered the preferred embodiment of this invention.

The method of impregnating or treating asbestos material may comprise any of the conventional means of impregnating yarn, cloth, paper, etc., such as for example dipping, spraying, coating, etc., it being necessary only that the impregnating means employed will provide a wet based pickup of approximately 5% to 150% (slurry) by weight of the material being treated, or, a dry based pickup of approximately 0.15% to 75% (solids) by weight of the material. Depending upon the amount of impregnating slurry or dispersion pickup and the amount desired, it may be necessary or advantageous to remove excess slurry from the treated material. Such a step may be effected by any conventional means such as for example squeeze rolls, brushing, shaking, centrifugal action, vibration, etc., provided it does not damage the material or adversely effect a particular characteristic or characteristics considered desirable or necessary for its intended use. Subsequent to the application of the impregnating or treating composition in slurry form and the removal of excess slurry, if necessary, the treated asbestos material is dried to reduce its moisture content to approximately 10% and preferably to about 5 to 7%. Substantially any conventional drying means, such as a drying oven, drying cans, etc., or even air drying, may satisfactorily be employed in the drying step; however, it is considered highly desirable that the oven or other drying means be provided with air circulating means, preferably forced draft. Drying of the asbestos material is preferably carried out at a temperature of from approximately 210° F. to 500° F. However, among other factors the temperature depends upon the extent of preliminary drying, if any, speed of the material through the drying means or time of exposure, whether the draft is gravity or forced.

The following are examples of various composition formulations for specific and general uses, and their general method of application. It is to be understood of course that the compositions for and method of applying the same to specific asbestos articles or products are exemplary and are not to be considered to limit the invention to any of the particular compositions or operating conditions outlined. Percentages indicated in the examples are by weight.

*Example I*

An impregnating composition for asbestos gloves or mittens was prepared as a slurry by thoroughly mixing the following ingredients:

| | Percentages |
|---|---|
| Bentonite | 2.9 |
| Sodium silicate (42% solids) | 13.0 |
| Zinc oxide | 1.9 |
| Sodium methyl siliconate (25% silicone) | 2.9 |
| Water | 79.3 |

The formulation may additionally include relatively small amounts of a compatible surface active agent and a colorant. Completed gloves or mittens were manually dipped, one slow dip, into the treating slurry and the excess slurry removed by wiping off with a stiff brush to provide a wet pickup of approximately 35% by weight and a dry pickup of approximately 3.5% by weight. The treated gloves or mittens were then dried at approximately 240° F. to 260° F. for one hour. The said treated gloves or mittens exhibit vastly improved abrasion, oil, grease, and water resistance, among other improvements.

*Example II*

An impregnating composition for asbestos braid tubing was prepared as a slurry by thoroughly mixing the following ingredients:

| | Percentages |
|---|---|
| Bentonite | 2.9 |
| Sodium silicate (42% solids) | 13.0 |
| Zinc oxide | 1.9 |
| Sodium methyl siliconate (25% silicone) | 2.9 |
| Water | 79.3 |

Small amounts of both a compatible surface active agent and a colorant, i.e., a fraction of a percent, may be added to the slurry if desired. The asbestos braid was immersed in the slurry and then squeezed between two rubber rolls to remove excess slurry until a dry based pickup of approximately 7.6% of solids by weight of the braid is obtained. The material was then dried continuously at approximately 400° F. with an air flow of approximately 276 cubic feet per minute and at a rate of about 10 feet per minute. Additionally the braid was stretched approximately 10% during drying. The foregoing treatment substantially improved the abrasion and abraiding resistance of the tubing and increased its dimensional stability as well as eliminating lint.

Example III

An impregnating composition for asbestos safety cloth was prepared as a slurry by thoroughly mixing the following ingredients:

| | Percentages |
|---|---|
| Bentonite | 1.5 |
| Sodium silicate (42% solids) | 6.5 |
| Zinc oxide | 1.0 |
| Sodium methyl siliconate (25% silicone) | 1.5 |
| Water | 89.5 |

A small amount, approximately 1/25%, of a compatible surface active agent was added to the above formulation. The fabric was immersed in the slurry, then squeezed between rubber rolls to obtain a pickup of from 70 to 75% by weight on the wet basis and 3 to 4% of solids. The treated fabric was then dried in a forced draft steam heated oven at 220° F. for two hours to reduce the moisture content of the fabric to about 5 to 7%. The foregoing treatment prevents curling and unravelling of the fabric, increases abrasion, fire and water resistance, increases tensile strength, and eliminates lint.

Example IV

An impregnating composition for asbestos tape was prepared as a slurry by thoroughly mixing the following ingredients:

| | Percentages |
|---|---|
| Bentonite | 4.8 |
| Sodium silicate (42% solids) | 19.4 |
| Zinc oxide | 2.9 |
| Sodium methyl siliconate (25% silicone) | 2.9 |
| Water | 70.0 |

A compatible surface agent and a dye were each added in an amount of approximately 1/25% to the above. Untreated asbestos tape was impregnated by immersion in a slurry of the foregoing formulation and squeezed with rubber rolls upon its removal from the slurry to provide a wet pickup of approximately 70% by weight of the tape or approximately 12% solids. The tape was then dried at 230° F. to 260° F. for 1¼ hours in a gravity draft steam oven to a moisture content of approximately 5 to 7%. The specified treatment produced a flame resistant tape of greatly increased tensile strength both before and after burnout of the organic carrying fibers, as well as improved resistance to leaching and and to acid, alkali or neutral ground waters.

Some of the numerous variations or modifications obtainable, and/or equivalents within the scope of this invention are illustrated by the following examples:

Example V

| | Percentages |
|---|---|
| Bentonite | 23.2 |
| Sodium silicate (42% solids) | 23.2 |
| Zinc oxide | 2.1 |
| General Electric SC-50 (20% silicone) | 12.9 |
| Water | 38.6 |

Example VI

| | |
|---|---|
| Bentonite | 0.5 |
| Sodium silicate (42% solids) | 12.6 |
| Zinc oxide | 0.8 |
| DeCetex 108 emulsion (30% silicone) | 8.6 |
| XEY-16 Catalyst, peroxide (20% concentration) | 1.5 |
| Wetting agent | 0.1 |
| Water | 75.9 |

Example VII

| | Percentages |
|---|---|
| Bentonite | 3.44 |
| Sodium silicate (42% solids) | 86.11 |
| Zinc oxide | 1.72 |
| Dow Corning XS-1 (25% silicone) | 8.61 |
| Wetting agent | 0.12 |

Example VIII

| | |
|---|---|
| Bentonite | 0.01 |
| Sodium silicate (42% solids) | 0.32 |
| Zinc oxide | 0.01 |
| Dow Corning XS-1 (25% silicone) | 0.03 |
| Wetting agent | 0.04 |
| Water | 99.59 |

Example IX

| | |
|---|---|
| Bentonite | 5.82 |
| Potassium silicate (27% solids) | 5.82 |
| Zinc oxide | 0.65 |
| Dow Corning XS-1 (25% silicone) | 3.27 |
| Wetting agent | 0.04 |
| Water | 84.40 |

Example X

| | |
|---|---|
| Bentonite | 1.02 |
| Potassium silicate (27% solids) | 25.40 |
| Zinc oxide | 0.51 |
| Dow Corning XS-1 (25% silicone) | 2.54 |
| Wetting agent | 0.03 |
| Water | 70.50 |

Due to the impregnating treatment of asbestos tape, cloth, etc., with the composition of the invention, the tensile strength of such materials may be further increased by stretching subsequent to their impregnation. Stretching of the asbestos materials may conveniently be carried out by applying tension while they pass through the drying means. Further, stretching may also be advantageous in that it overcomes the small amount, approximately 2 to 3%, of shrinking which may produce a thicker and heavier product and it additionally will remove wrinkles. Also it is possible to remove wrinkles by means of calendering; however, this may affect or destroy certain properties of the asbestos material which are desirable or essential for particular use.

The terms "asbestos," "asbestos material" or "asbestos product" in this specification and/or any of the claims are intended to include woven and non-woven cloth or fabric, yarn, tape, braid, paper, felt, etc.

It will be understood that the details given are for the purpose of illustration, not restriction, and that variations within the spirit of the invention are intended to be included in the scope of the appended claims.

What I claim is:

1. An impregnating composition for asbestos comprising an aqueous slurry consisting essentially of approximately 60 to 95% by weight of water and the following ingredients in the approximate percentages by dry weight indicated:

| | |
|---|---|
| Bentonite | 0.01–30.0 |
| Alkali metal silicate | 0.04–50.0 |
| Zinc oxide | 0.01–26.0 |
| Silicone water repellent | 0.03–10.0 |

2. An impregnating composition for asbestos consisting essentially of the following ingredients in the approximate percentages by weight indicated:

| | |
|---|---|
| Bentonite | 0.5–5.0 |
| Alkali metal silicate (approximately 42% solids) | 2.0–25.0 |
| Zinc oxide | 0.3–5.0 |
| Silicone water repellent | 0.05–1.25 |
| Water | 70.0–90.0 |

3. An impregnating composition for asbestos comprising an aqueous slurry consisting essentially of approximately 60 to 95% by weight of water and the following ingredients in the approximate percentages by dry weight indicated:

| | |
|---|---|
| Bentonite | 0.01–30.0 |
| Sodium silicate | 0.04–50.0 |
| Zinc oxide | 0.01–26.0 |
| Silicone water repellent | 0.03–10.0 |

4. An impregnating composition for asbestos consisting essentially of the following ingredients in the approximate percentages by weight indicated:

| | |
|---|---|
| Bentonite | 0.5–5.0 |
| Sodium silicate (approximately 42% solids) | 2.0–25.0 |
| Zinc oxide | 0.3–5.0 |
| Silicone water repellent | 0.05–1.25 |
| Water | 70.0–90.0 |

5. An impregnating composition for asbestos comprising an aqueous slurry consisting essentially of approximately 60 to 95% by weight of water and the following ingredients in the approximate percentages by dry weight indicated:

| | |
|---|---|
| Bentonite | 0.01–30.0 |
| Alkali metal silicate | 0.04–50.0 |
| Zinc oxide | 0.01–26.0 |
| Sodium methyl siliconate | 0.03–10.0 |

6. An impregnating composition for asbestos consisting essentially of the following ingredients in the approximate percentages by weight indicated:

| | |
|---|---|
| Bentonite | 0.5–5.0 |
| Alkali metal silicate (approximately 42% solids) | 2.0–25.0 |
| Zinc oxide | 0.3–5.0 |
| Sodium methyl siliconate | 0.05–1.25 |
| Water | 70.0–90.0 |

7. An impregnating composition for asbestos comprising an aqueous slurry consisting essentially of approximately 60 to 95% by weight of water and the following ingredients in the approximate percentages by dry weight indicated:

| | |
|---|---|
| Bentonite | 0.01–30.0 |
| Sodium silicate | 0.04–50.0 |
| Zinc oxide | 0.01–26.0 |
| Sodium methyl siliconate | 0.03–10.0 |

8. An impregnating composition for asbestos consisting essentially of the following ingredients in the approximate percentages by weight indicated:

| | |
|---|---|
| Bentonite | 0.5–5.0 |
| Sodium silicate (approximately 42% solids) | 2.0–25.0 |
| Zinc oxide | 0.3–5.0 |
| Sodium methyl siliconate | 0.05–1.25 |
| Water | 70.0–90.0 |

9. An impregnating composition for asbestos consisting essentially of the following ingredients in the approximate percentages by weight indicated:

| | |
|---|---|
| Bentonite | 2.9 |
| Sodium silicate (approximately 42% solids) | 13.0 |
| Zinc oxide | 1.9 |
| Sodium methyl siliconate (approximately 25% silicone) | 2.9 |
| Water | 79.3 |

10. An impregnating composition for asbestos consisting essentially of the following ingredients in the approximate percentages by weight indicated:

| | |
|---|---|
| Bentonite | 4.8 |
| Sodium silicate (approximately 42% solids) | 19.4 |
| Zinc oxide | 2.9 |
| Sodium methyl siliconate (approximately 25% silicone) | 2.9 |
| Water | 70.0 |

11. An impregnating composition for asbestos consisting essentially of the following ingredients in the approximate percentages by weight indicated:

| | |
|---|---|
| Bentonite | 1.5 |
| Sodium silicate (approximately 42% solids) | 6.5 |
| Zinc oxide | 1.0 |
| Sodium methyl siliconate (approximately 25% silicone) | 1.5 |
| Water | 89.5 |

12. A method of treating asbestos which includes impregnating the same with an aqueous slurry consisting essentially of approximately 60 to 95% by weight of water and the following ingredients in the approximate percentages by dry weight indicated:

| | |
|---|---|
| Bentonite | 0.01–30.0 |
| Alkali metal silicate | 0.04–50.0 |
| Zinc oxide | 0.01–26.0 |
| Silicone water repellent | 0.03–10.0 |

13. A method in accordance with claim 12 in which the slurry is picked up in an amount of approximately 5 to 150% by weight of the asbestos.

14. A method in accordance with claim 13 in which the impregnated asbestos is dried to a moisture content of at least approximately 10% by weight of the asbestos.

15. A method of treating asbestos which includes impregnating the same with a slurry consisting essentially of the following ingredients in the approximate percentages by weight indicated:

| | |
|---|---|
| Bentonite | 0.5–5.0 |
| Alkali metal silicate (approximately 42% solids) | 2.0–25.0 |
| Zinc oxide | 0.3–5.0 |
| Silicone water repellent | 0.05–1.25 |
| Water | 70.0–90.0 |

16. A method in accordance with claim 15 in which the slurry is picked up in an amount of approximately 5 to 150% by weight of the asbestos.

17. A method in accordance with claim 16 in which the impregnated asbestos is dried to a moisture content of at least approximately 10% by weight of the asbestos.

18. A method of treating asbestos which comprises impregnating the same sufficiently to provide a wet based pickup of from approximately 5 to 150% by weight of said asbestos of an aqueous slurry consisting essentially of approximately 60 to 95% by weight of water and the following ingredients in the approximate percentages by dry weight indicated:

| | |
|---|---|
| Bentonite | 0.01–30.0 |
| Alkali metal silicate | 0.04–50.0 |
| Zinc oxide | 0.01–26.0 |
| Silicone water repellent | 0.03–10.0 | heating the impregnated asbestos to a temperature of approximately 210° F. to 500° F. for a period sufficient to reduce its moisture content to not more than about 10%.

19. An asbestos product formed by the method of claim 18.

20. A method of treating asbestos which comprises impregnating the same sufficiently to provide a wet based pickup of from 5 to 150% by weight of said asbestos of a slurry consisting essentially of the following ingredients in the approximate percentages by weight indicated:

| | |
|---|---|
| Bentonite | 0.5–5.0 |
| Sodium silicate (approximately 42% solids) | 2.0–25.0 |
| Zinc oxide | 0.3–5.0 |
| Silicone water repellent | 0.05–1.25 |
| Water | 70.0–90.0 | heating the impregnated asbestos to a temperature of approximately 210° F. to 500° F. for a period necessary to reduce its moisture content to not more than about 10%.

21. A method of treating asbestos which comprises impregnating the same sufficiently to provide a wet based pickup of from 5 to 150% by weight of said asbestos of a slurry consisting essentially of the following ingredients in the approximate percentages by weight indicated:

| Ingredient | Percent |
|---|---|
| Bentonite | 0.5–5.0 |
| Sodium silicate (approximately 42% solids) | 2.0–25.0 |
| Zinc oxide | 0.3–5.0 |
| Sodium methyl siliconate | 0.05–1.25 |
| Water | 70.0–90.0 | heating the impregnated asbestos to a temperature of approximately 210° F. to 500° F. for a period necessary to reduce its moisture content to approximately 5 to 7%.

References Cited in the file of this patent

UNITED STATES PATENTS

| | | |
|---|---|---|
| 2,350,030 | Greider et al. | May 30, 1944 |
| 2,372,284 | Marc | Mar. 27, 1945 |
| 2,494,920 | Warrick | Jan. 17, 1950 |
| 2,588,828 | Greiner | Mar. 11, 1952 |
| 2,648,654 | Dereich | Aug. 11, 1953 |
| 2,717,219 | Ford et al. | Sept. 6, 1955 |
| 2,833,673 | Hart et al. | May 6, 1958 |